US011652933B2

(12) United States Patent
Nakahara

(10) Patent No.: US 11,652,933 B2
(45) Date of Patent: May 16, 2023

(54) NETWORK DEVICE AND NETWORK DEVICE CONTROL METHOD

(71) Applicant: CANON KABUSHIKI KAISHA, Tokyo (JP)

(72) Inventor: Hidetaka Nakahara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/548,821

(22) Filed: Dec. 13, 2021

(65) Prior Publication Data

US 2022/0239790 A1 Jul. 28, 2022

(30) Foreign Application Priority Data

Jan. 22, 2021 (JP) .............................. JP2021-008767

(51) Int. Cl.
*H04N 1/00* (2006.01)
(52) U.S. Cl.
CPC ..... *H04N 1/00344* (2013.01); *H04N 1/00244* (2013.01); *H04N 1/001* (2013.01)
(58) Field of Classification Search
CPC ........... H04N 1/00344; H04N 1/00244; H04N 1/001
USPC ....................................... 358/1.15
See application file for complete search history.

(56) References Cited

U.S. PATENT DOCUMENTS

| 10,382,401 B1* | 8/2019 | Lee ........................ H04L 63/166 |
| 11,070,635 B2* | 7/2021 | Matsumoto ............. H04L 67/04 |
| 2014/0354851 A1* | 12/2014 | Yasuoka ................. G06F 16/11 |
| | | 348/231.99 |

FOREIGN PATENT DOCUMENTS

JP 2020-087323 A 6/2020

* cited by examiner

*Primary Examiner* — Darryl V Dottin
(74) *Attorney, Agent, or Firm* — Venable LLP

(57) ABSTRACT

A network device manages a first definition information in which a type of data to be collected in the network device and a first collection condition are defined received from a first client application, manages, after a second client application for transmitting data to a second system via the network is added to the network device, second definition information in which a type of data to be collected in the network device and a second collection condition are defined received from the added second client application, and collects data in the network device in accordance with the first definition information and second definition information. Data to be collected in accordance with both the first collection condition and the second collection condition is collected at a same timing.

5 Claims, 9 Drawing Sheets

FIG. 8

```
"collections": [
{
 "collection": ["Power", "Alarm"],    ─ 801
 "fire": "realtime",
}, {
 "collection": ["Basic"],    ─ 802
 "fire": "up/cron(0 */6 * * *)",
}, {
 "collection": ["Counter", "PartsCounter"],    ─ 803
 "fire": "cron(0 */12 * * *)",
}
]
```

800

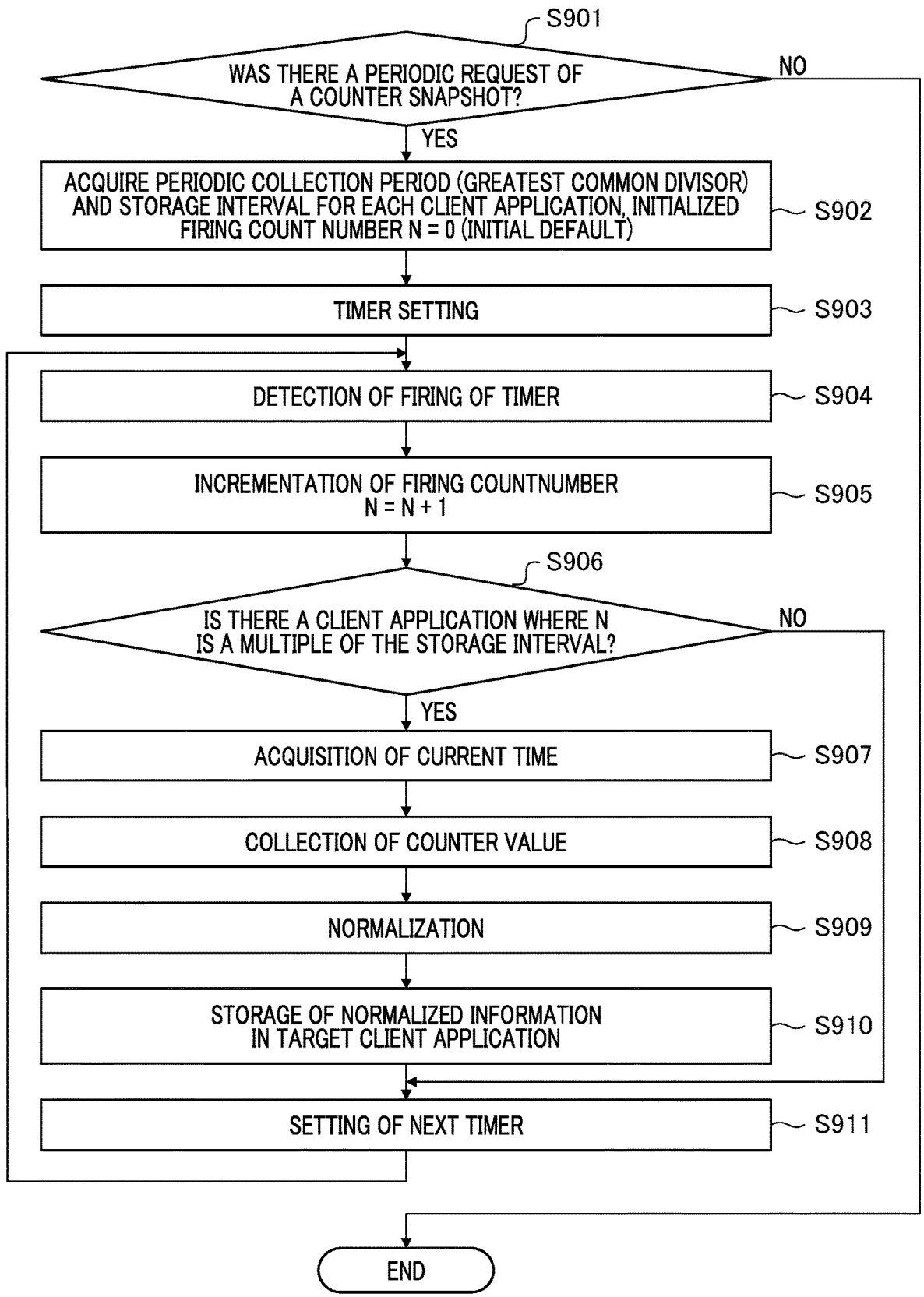

NETWORK DEVICE AND NETWORK DEVICE CONTROL METHOD

BACKGROUND OF THE INVENTION

Field of the Invention

The present invention relates to a network device and a control method for a network device.

Description of the Related Art

A system has hitherto been known for transmitting a large amount of various event logs from an operating device to a server for managing event logs via the Internet and storing the event logs in a server. In the server, the accumulated event logs and applications on the server are utilized to analyze various changes in the state of a device and to quickly perform actions such as notification of the replacement of consumables or of the arrangement of maintenance work and the like according to the generated matters. In addition, in the server, the operation history of the user is managed, and whether the analysis of the usage state or device is correctly handled or the like is confirmed. For this reason, it is necessary to send a matter occurring on the device in the form of an event log that can be easily handled by an application on the server side.

In addition, a configuration also exists in which a plurality of cloud services are launched for each function, such as a cloud service primarily for maintenance of the device and a cloud service for managing the use state of the user, and one device is connected to a plurality of cloud services at the same time. When a plurality of cloud services are connected, the device needs to reliably send an event necessary for the operation of each cloud service. At the same time, strict management is also required to ensure that no data outside of a contract is sent. However, it is not efficient to operate the event data collection mechanism corresponding to each cloud service in a multiple manner on the device.

Japanese Patent Application Laid-Open No. 2020-87323 discloses a method in which one event collection cloud receives a data collection request from a plurality of services and integrates them as one collection request to a device. Thereby, the device can send data only by operating one event data collection mechanism for a request from a plurality of services.

However, a method of merging requests on a cloud, as disclosed in Japanese Patent Application Laid-Open No. 2020-87323, discloses only the case in which one event collection cloud can be used, and the case in which a plurality of event collection clouds exists is not assumed. In a case where there is a plurality of cloud systems for collecting information, it is necessary to add a transmission client application for another cloud system on the device side that is an information transmission source. Even when a plurality of transmission client applications is executed, the information collection operation in a device to be transmitted should be unified and efficient.

In addition, the transmission of the device data to the cloud service may strictly define data that can be sent based on a contract or the like. Furthermore, depending on the contract, it may not be possible to disclose information to be collected to another cloud system. Therefore, it is necessary to control the device so as not to send data outside the scope of the contract from the device to the cloud service, and furthermore, it is necessary to guarantee separated functionality that will not be referred to by mutual transmission targets among a plurality of transmission client applications.

SUMMARY OF THE INVENTION

The present invention does not transmit data that is not to be collected to each cloud service when transmitting data to a plurality of cloud services.

A network device according to the present invention is a network device in which a first client application for transmitting data via a network to a first system is executed, the network device comprising: at least one memory storing instructions; and one or more processors configured to execute the instructions, which when executed by the one or more processors, cause the network device to: manage a first definition information in which a type of data to be collected in the network device and a condition to be collected are defined received from the first client application; and collect data in the network device in accordance with the first definition information, wherein collected data is stored in a first dedicated area reserved for the first client application, wherein the first client application transmits the data acquired from the first dedicated area to the first system, wherein when a second client application for transmitting data to a second system via a network is added to the network device, and when a second definition information in which the type of data to be collected in the network device and the collection condition are defined is received from the second client application, wherein the instruction causes the network device to collect a target data in accordance with the condition with respect to data in which the conditions collected in the first definition information and the second definition information match, and wherein the instruction causes the network device to store the target data collected at a time in accordance with the condition in the first dedicated area and a second dedicated area that is reserved for the second client application Further features of the present invention will become apparent from the following description of exemplary embodiments with reference to the attached drawings.

BRIEF DESCRIPTION OF THE DRAWINGS

FIG. 8 is a diagram illustrating an example of a collection file.

FIG. 9 s a flowchart illustrating the event collection and storage process in a second embodiment.

DESCRIPTION OF THE EMBODIMENTS

First Embodiment

Figure 1:
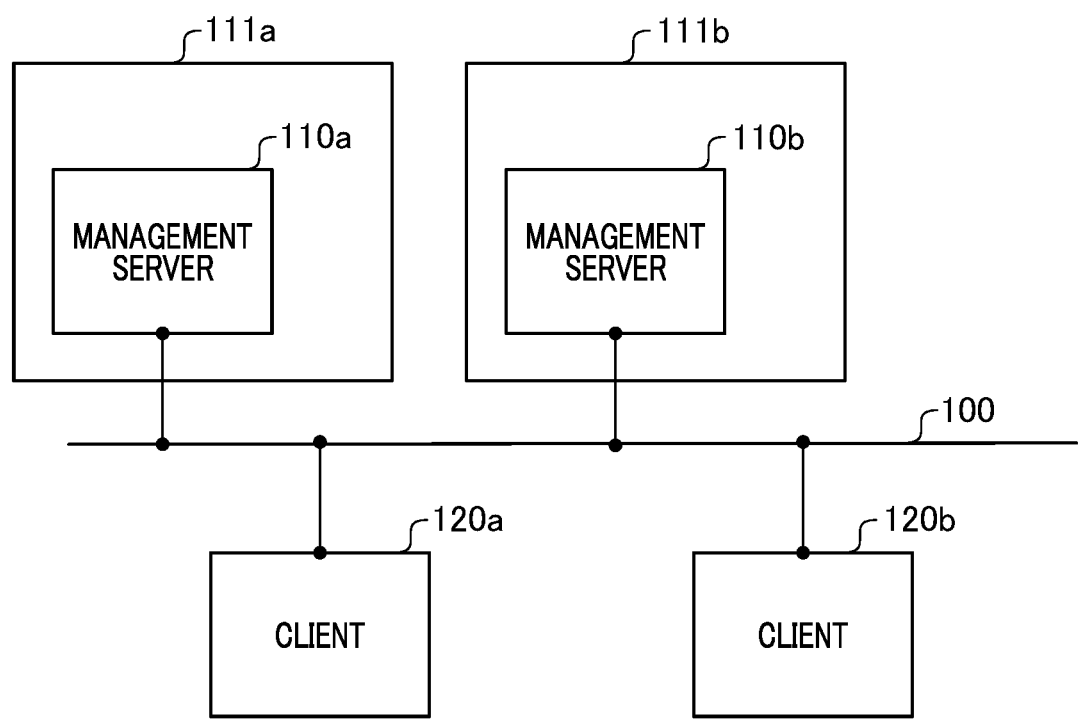
FIG. 1 is a is a diagram illustrating the overall configuration of a system.

FIG. 1 is a diagram illustrating an overall configuration of a system for collecting data in a device from a network device connected via a network according to the present invention. A plurality of management servers 110 (management server 110a and management server 110b) and clients 120 (client 120a and client 120b) are connected to a network 100. The management server 110a and the management server 110b each acquire data collected in the device from the client 120 and belong to different systems (first system 111a, second system 111b) that use the acquired data.

The client 120 is a network device connected to the network 100 and capable of performing communication, and is, for example, an information processing device such as a PC, a tablet, a multifunction machine, or a camera. In the present embodiment, a multifunction machine that realizes a plurality of types of functions, such as copying and faxing, is explained as an example of the client 120. Furthermore, the client 120 of the present embodiment has a function of transmitting the data collected in the device to the management server 110 via the network 100. The client 120 transmits a matter in the device to the management server 110 in the form of an event. An event to be transmitted to the management server 110 includes, for example, a history of execution of a function, a history showing an operation status of the device such as a history of transition to a power-saving state or recovery therefrom, a history of transition to an abnormal state such as error occurrence or recovery therefrom, or the like.

The management server 110 is an information processing device that collects events from a device on the network, such as a client 120, via the network 100. The collected events are stored in a storage in the management server 110. In addition, the information of an event stored in the storage is then used to analyze the operating status of the device, to provide a service according to the analysis results, and the like. Note that in addition to the server device, the management server 110 may be realized by a virtual machine (cloud service) using resources provided by a data center, including a server device.

Figure 2:
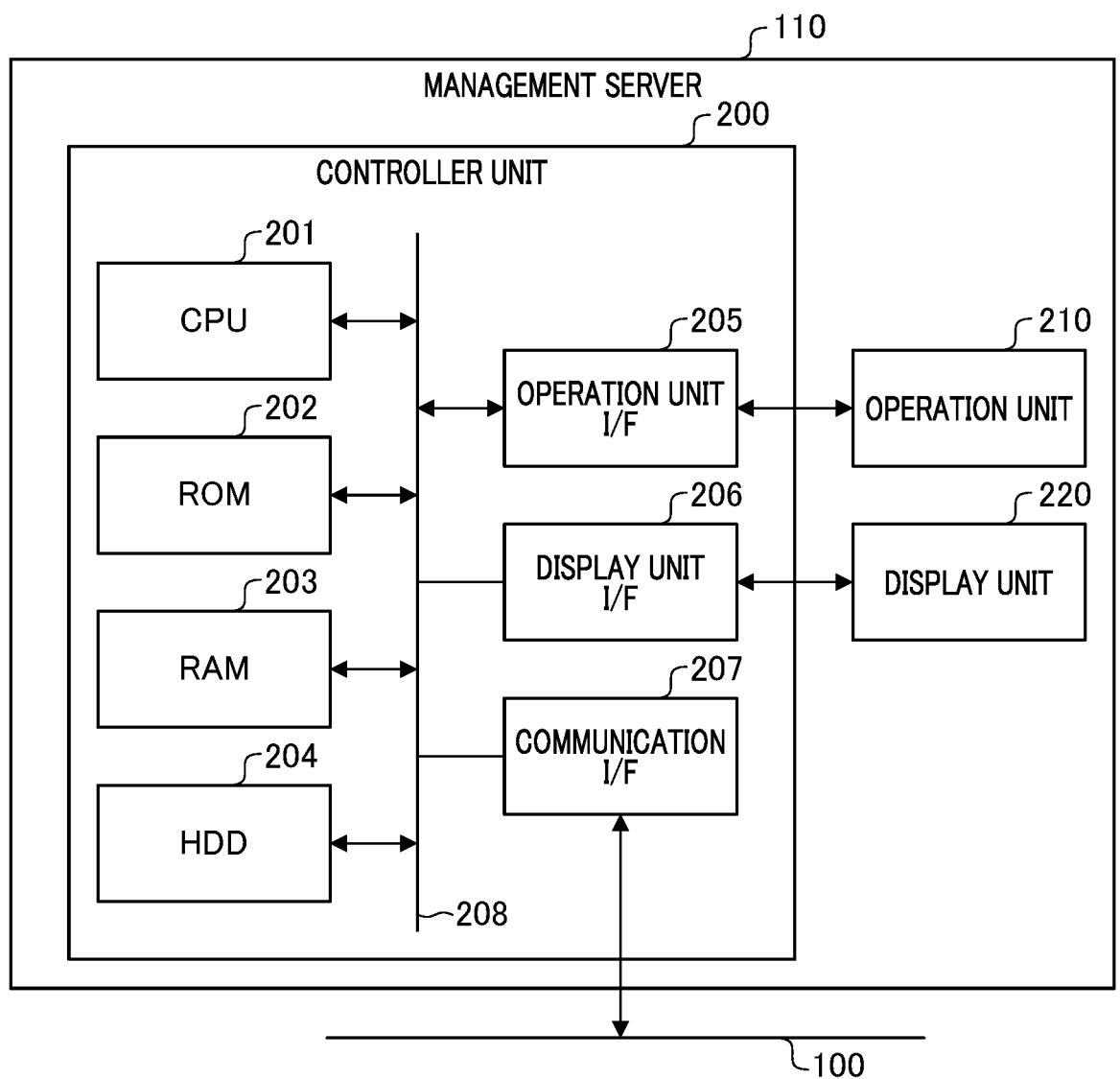
FIG. 2 is a diagram illustrating the configuration of a management server.

FIG. 2 is a diagram illustrating the configuration of the management server 110 (management server 110a and management server 110b). The management server 110 is provided with a controller unit 200, an operation unit 210, and a display unit 220. The controller unit 200 is provided with a CPU 201, a ROM 202, a RAM 203, an HDD 204, an operation unit I/F 205, a display unit I/F 206, and a communication I/F 207. Each element in the controller unit 200 is connected via a system bus 208 and exchanges data with each other.

A CPU 201 (Central Processing Unit) controls the entire management server 110. The CPU 201 boots an OS (Operating System) using a boot program stored in the ROM 202. Further, the CPU 201 executes an application program stored in the HDD 204 on the OS so as to perform each process thereby.

The ROM (Read Only Memory) 202 is a non-volatile storage area that stores various data such as a basic control program, an OS (Operating System), and an application and the like of the management server 110. A basic control program includes a boot program. The RAM (Random Access Memory) 203 is a volatile storage area and is used as a temporary storage area and a work area when the CPU 201 performs various types of processing. The CPU 201 deploys various control programs stored in the ROM 202 and the HDD 204 in the RAM 203.

The HDD (Hard Disk Drive) 204 is a non-volatile mass storage unit. The HDD 204 stores an application program, a setting value, data such as an event collected from a device on the network, and the like. Note that although the HDD 204 is explained as an example of a storage unit in the present embodiment, the HDD 204 is not limited thereto, and may be an SSD (Solid State Drive) or an external medium such as a memory card that can be loaded to read/write data.

The operation unit 210 is, for example, a pointing device (for example, a mouse, a touch panel, and the like), an operation button, a keyboard, and the like, and receives an operation, an input, and an instruction by a user. The operation unit I/F 205 is an interface with the operation unit 210 and transmits information input by the user to the CPU 201 by the operation unit 210. The display unit 220 is, for example, a liquid crystal display, a touch panel, and the like, and displays images and various data. The display unit I/F 206 outputs data to be displayed on the display unit 220 to the display unit 220. The operation unit 210 and the display unit 220 may be integrally configured as a touch panel and the like.

The communication I/F 207 is connected to the network 100 and inputs and outputs information to and from each device on the network 100 via the network 100. Note that the configuration of the management server 110 explained with reference to FIG. 2 is an example in which the management server 110 is implemented by an information processing device such as a general computer, and is not limited thereto. For example, the management server 110 may not include the operation unit 210, the display unit 220, or an interface corresponding thereto.

Figure 3:
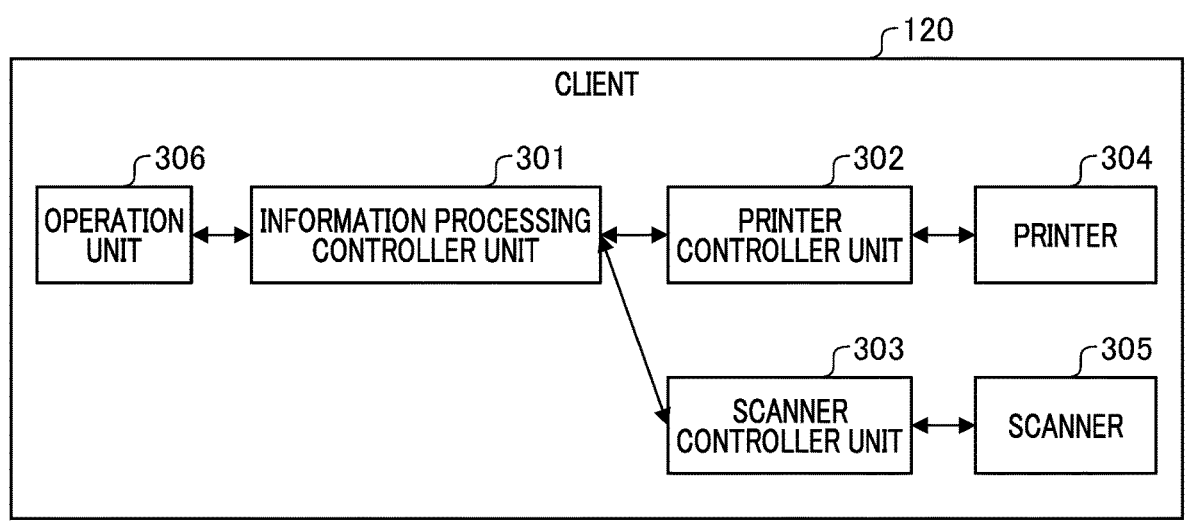
FIG. 3 is a diagram explaining the outline of a configuration of a client.

FIG. 3 is a diagram explaining an outline of a configuration of a client 120 (client 120a, client 120b). The client 120 is a multifunction machine including an information processing controller unit 301, a printer controller unit 302, a scanner controller unit 303, a printer 304, a scanner 305, and an operation unit 306. The information processing controller unit 301 is a controller for controlling the information processing control related to the operation of the client 120. A detailed explanation of the information processing controller unit 301 will be described below with reference to FIG. 4.

The information processing controller unit 301 is connected to the operation unit 306, the printer controller unit 302, and the scanner controller unit 303. The operation unit 306 is provided with a display device and an input device, displays various types of information to a user, and also receives an operation, an input, and an instruction by a user. The display device is, for example, a liquid crystal display or a touch panel. The input device is, for example, a pointing device (for example, a mouse, a touchpad, a touch panel, and the like), an operation button, a keyboard, and the like. In the present embodiment, a case in which the client 120 includes a touch panel as the operation unit 306 is explained as an example. By associating the input coordinates and the display coordinates in the touch panel, it is possible to configure a GUI as if the user can directly operate the screen displayed on the touch panel.

The printer 304 is an image output device that forms an image corresponding to print data received from an external source and outputs the image to a sheet of paper, or optically reads a document image set in the scanner 305 and outputs the image to a sheet of paper. The printer controller unit 302 controls the printer 304. The scanner 305 is an image input device that optically reads a document and generates an electronic file (scan data) based on the scan. The scanner controller unit 303 controls the scanner 305.

Figure 4:
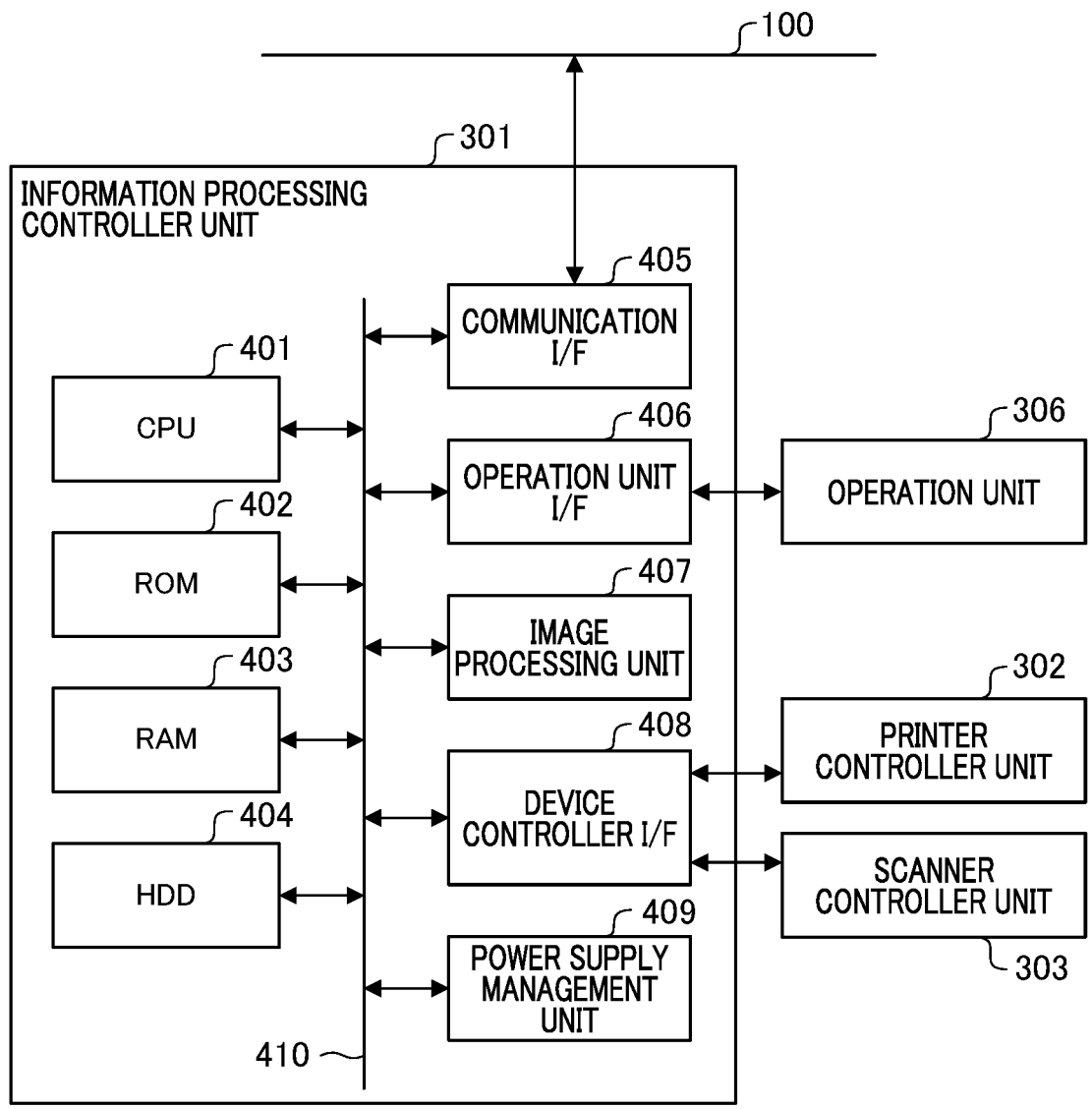
FIG. 4 is a diagram illustrating the configuration of an information processing controller unit of a client.

FIG. 4 is a diagram illustrating a configuration of the information processing controller unit 301 of the client 120. The information processing controller unit 301 includes a CPU 401, a ROM 402, a RAM 403, an HDD 404, a communication I/F 405, an operation unit I/F 406, an image processing unit 407, a device controller I/F 408, and a power supply management unit 409. Each element in the information processing controller unit 301 is connected via a system bus 410 and exchanges data with each other.

The CPU 401 controls the entire client 120. The CPU 401 boots an OS by means of a boot program stored in the ROM 402 and executes an application program stored in the HDD 404 on the OS to execute each type of processing described below. The ROM 402 is a non-volatile storage area and stores various types of data such as a basic control program, an operating system (OS), and an application and the like of the client 120. A boot program is included in the basic control program. The RAM 402 is a volatile storage area and is used as a temporary storage area and a work area when the CPU 401 performs various types of processing. The RAM 403 provides an image memory area for temporarily storing image data. The CPU 401 deploys various control programs stored in the ROM 402 and the HDD 404 in the RAM 403. That is, by executing a program stored in the readable storage medium, the CPU 201 functions as each processing unit that executes the processing described below.

The HDD 404 is a non-volatile mass storage unit. The HDD 404 stores an application program, image data, various setting values, histories, and the like. Note that although the HDD 404 is explained as an example of a storage unit in the present embodiment, this is not limited thereto, and may be an SSD or an external medium such as a memory card that can be loaded to read/write data.

The communication I/F 405 is connected to the network 100 and inputs and outputs information to and from each device on the network 100, for example, the management server 110, via the network 100. The operation unit I/F 406 is an interface with the operation unit 306. The operation unit I/F 406 transmits the information input by a user to the CPU 401 by means of the operation unit 306, and outputs the data to be displayed on the operation unit 306 to the operation unit 306.

The image processing unit 407 performs various types of image processing on an image output to the printer 304 or an image acquired by the scanner 305. Examples of various types of image processing include processing such as image rotation, image compression, resolution conversion, color space conversion, gradation conversion, and the like. The device controller I/F 408 is connected to the printer controller unit 302 and the scanner controller unit 303, and controls input/output of data of the printer controller unit 302 with the scanner controller unit 303 and the CPU 401. In addition, the device controller I/F 408 performs synchronous/asynchronous system conversion of the image data. The power supply management unit 409 controls the power supply of the client 120. Specifically, the power management unit 409 controls transition to a power saving state other than a normal powering state, a recovery to a normal state, or the like in addition to power on/off control.

Figure 5:
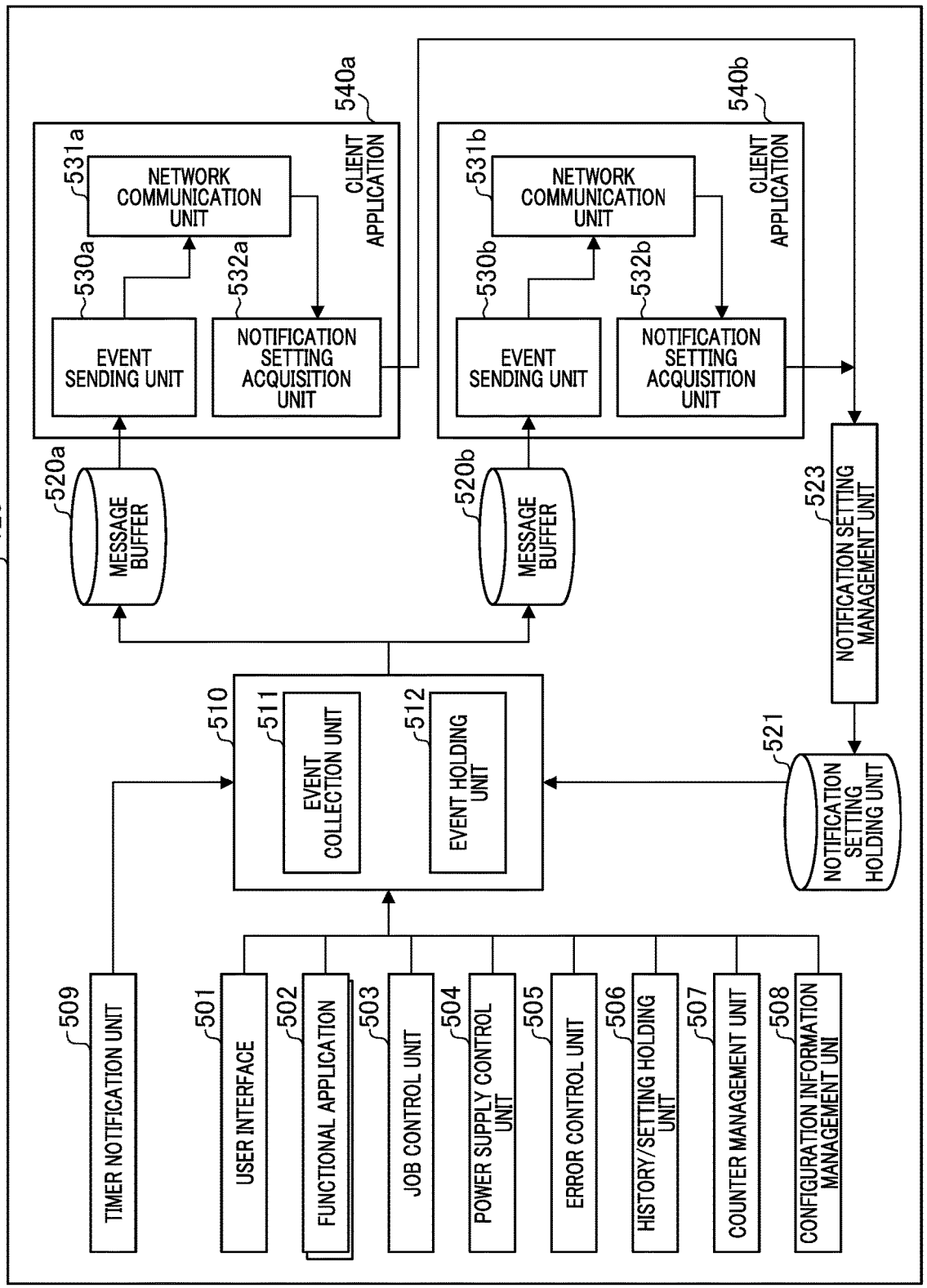
FIG. 5 is a diagram illustrating the software configuration of a client.

FIG. 5 is a diagram illustrating a software configuration of a client 120. The CPU 201 functions as each processing unit by deploying and executing a program stored in the ROM 402 and the HDD 404 in the RAM 403. In the client 120, software for implementing functions of a composite machine, such as scanning and printing, operates in addition to software for implementing a function of a general information processing device using a network or a memory storage.

The client 120 includes a user interface 501, a functional application 502, a job control unit 503, a power supply control unit 504, an error control unit 505, a history/setting holding unit 506, a counter management unit 507, a configuration information management unit 508, and a timer notification unit 509. Further, the client 120 includes an event management unit 510, a message buffer 520, a client application 540, a notification setting management unit 523, and a notification setting holding unit 521.

The client application 540 transmits data to a system for collecting operation information and the like of the client 120. Therefore, the client application 540 is added to the client 120 for each system for collecting the operation information and the like of the client 120. In addition, the message buffer 520 is provided for each client application 540. In the present embodiment, an example is explained in which the client 120 is managed by two systems (management server 110a and management server 110b) that collect data in the client. Therefore, in the present embodiment, a client 120 is provided with two of a client application 540 and two of a message buffer 520 for each system. In a specific example, a client application 540a and a message buffer 520a, a client application 540b and a message buffer 520b are provided.

The user interface 501 displays a screen operated by the user with respect to the operation unit 306, or transmits the operation of the user via the operation unit 306 to the software. The functional application 502 operates the application function of the multifunction machine. The application function of the multifunction machine is a plurality of functions, such as copying, printing, and e-mail transmission, and the like, and the functional application 502 is provided for each application function. That is, the client 120 has a plurality of the functional application 502. The functional application 502 uses an instruction of a user via the operation unit 306, data reception via the communication I/F 405, and the like as a trigger, and operates the application function of the multifunction machine.

The job control unit 503 receives an instruction from the function application 502, controls the printer controller unit 302 and the scanner controller unit 303 to execute printing or scanning. The power supply control unit 504 controls the power supply management unit 409 in conjunction with the state of the software in the client 120. In a specific example, the power supply control unit 504 controls transition between the normal energized state and the power saving state in accordance with the state of the software.

The error control unit 505 detects an abnormal state generated in the client 120, such as the job control unit 503, the printer controller unit 302, and the scanner controller unit 303. In addition, the error control unit 505 controls the operation state of the client 120 by instructing the stop, the degeneration operation, and the like of the application or the entire system according to the abnormal state. The history/setting holding unit 506 manages non-volatile information in the client 120. In a specific example, the history/setting holding unit 506 holds a setting necessary for the control of the multifunction machine or the job, and summarizes and stores the operation history of the user, the job execution result, the occurrence of the error, and the like. The history/setting holding unit 506 also holds log information to be left in the analysis debug application when a failure occurs in the system. The actual state of the non-volatile data managed by the history/setting holding unit 506 is held in the HDD 404.

The counter management unit 507 manages the count of the number of scans and the number of prints generated in the device, the count for measuring the degree of consumption of each consumable goods, and the life information of the parts calculated therefrom. The actual state of the non-volatile data such as the count and the lifetime information managed by the counter management unit 507 is held in the HDD 404. The configuration information management unit 508 manages the configuration of the hardware/software configuring the client 120. As hardware/software configuring the client 120, for example, an external accessory such as a paper feed cassette, a paper discharge tray, a finisher, or the like, a version of firmware, a list of installed applications, and the like are managed by the configuration information management unit 508.

The event management unit 510 collects data such as an operation state of the client 120 for transmitting to the management server 110 and stores the data in the form of an event. The event management unit 510 includes an event collection unit 511 and an event storage unit 512. The event collection unit 511 monitors a matter in the client 120 and collects the target data according to a condition designated from the client application 540. The event storage unit 512 normalizes the data in the client 120 collected by the event collection unit 511 in the form of an event in order to send the data to the management server 110, and stores the normalized data in the message buffer 520.

The collection of data in the client 120 by the event collection unit 511 will be explained. The event collection unit 511 collects data in the client 120 in accordance with the notification settings of the event stored in the notification setting holding unit 521 described below. For example, the event collection unit 511 monitors a state transition generated by a module (for example, a user interface 501 to a history/setting retention unit 506) that spontaneously issues an event and collects data of the state transition in real time. Further, in order to periodically collect the operating state of the client 120, the event collection unit 511 requests the timer notification unit 509 to fire the timer after the lapse of the designated time. After the lapse of the designated time, the event collection unit 511, which has received the notification from the timer notification unit 509, collects data periodically collected using the firing of the timer as a trigger. In this context, the periodically collected data that is the data periodically transmitted from the client 120 to the management server 110, and is a counter managed by the counter management unit 507, a configuration information managed by the configuration information management unit 508, and the like.

The event storage unit 512 normalizes the data in the client 120 collected by the event collection unit 511 into the form of an event, and stores the event in a message buffer for the client application instructed to collect the data. Normalization is performed using a general-purpose format, such as JSON, for example, in order to transmit the collected data to the management server 110. In addition to basic information such as an event name, an occurrence time, and a serial number of an information processing device, various types of information are added to the event in accordance with the type of event. The application information is collected from the state of each module in the client 120 and the content held in the non-volatile area by the event collection unit 511. The data normalized to the form of an event is stored in the message buffer 520.

The message buffer 520 holds the event normalized by the event storage unit 512. The message buffer 520 is provided on the non-volatile HDD 404 and is provided for each client application 540. The message buffer 520a is a dedicated area (first dedicated area) reserved for the client application 540a. Similarly, the message buffer 520b is a dedicated area (second dedicated area) reserved for the client application 540b. Therefore, the client application 540a cannot access the message buffer 520b, and the client application 540b also cannot access the message buffer 520a.

The client application 540 reads the data collected from the client 120 (in the network device) and stored in the message buffer 520, and sends the data to the management server 110. The client application 540 is present in a one-to-one manner with respect to the management server 110 connected thereto. Therefore, when a plurality of management servers 110 are connected, a plurality of a client application 540 are also present. The client 120 includes a client application 540a for transmitting data to the management server 110a of the first system 111a, and a client application 540b for transmitting data to the management server 110b of the second system 111b.

The client application 540 includes an event sending unit 530, a network communication unit 531, and a notification setting acquisition unit 532. The event sending unit 530 acquires the event stored in the message buffer 520 and transmits the event to the management server 110 corresponding to the client application 540. In a specific example, the event sending unit 530 detects that an event has been issued by detecting the writing to the dedicated message buffer 520 prepared in each client application, or the like. The event sending unit 530 that has detected the issuance of an event acquires an event from the message buffer 520 and sends the event to the management server 110 via the communication I/F 405 and network communication unit 531. The event sending unit 530a transmits the event acquired from the message buffer 520a that is a dedicated area of the client application 540a to the management server 110a. Similarly, the event sending unit 530b transmits the event acquired from the message buffer 520b that is a dedicated area of the client application 540b to the management server 110b.

The notification setting acquisition unit 532 receives the notification setting of the event from the management server 110 corresponding to the client application 540 via the network communication unit 531. Here, the notification setting of the event is the content indicating the definition information of which data is sent to the management server 110 as an event at which timing among the data in the device to be managed by the management server 110. The event notification setting is acquired as a collection file. A detailed description of the collection file will be explained below with reference to FIG. 8. The notification setting acquisition unit 532a receives the notification setting of an event from the management server 110a. Similarly, the notification setting acquisition unit 532b receives the notification setting of an event from the management server 110b. Then, the notification setting acquisition unit 532a and the notification setting acquisition unit 532b send the notification setting of the received event to the notification setting management unit 523.

The notification setting managing unit 523 acquires and manages the event notification setting from the notification setting acquisition unit 532 of the client application 540. If a notification setting for an event is acquired from a plurality of a client applications 540, the notification setting managing unit 523 integrates and manages the notification settings for a plurality of events. In addition, the notification setting management unit 523 stores the acquired notification setting of the event in the notification setting holding unit 521. A detailed description of the acquisition and management of the notification setting of the event will be described below with reference to FIGS. 7 and 8.

The notification setting holding unit 521 holds the notification setting of an event. The notification setting holding unit 521 is on a non-volatile HDD 404, and the notification setting of the event is stored in the form of a file. The notification setting holding unit 521 is held in the form of a file on the HDD 303. The event management unit 510 collects the event and stores the event in the message buffer 520 in accordance with the event notification setting stored in the notification setting holding unit 521.

As the notification setting of the event, the notification setting holding unit 521 records the type of data to be collected from the inside of the client 120 and the collection conditions. In addition, the notification setting holding unit 521 also records whether the collected events are stored in the message buffer 520 corresponding to which client application 540. In a specific example, the message buffer 520a corresponding to the client application 540a is designated as the storage destination of the event collected according to the notification setting of the event acquired from the client application 540a. Similarly, the message buffer 520b corresponding to the client application 540b is designated as the storage destination of the event collected according to the notification setting of the event acquired from the client application 540b.

The event storage unit 512 determines and stores the message buffer 520 serving as the storage destination of the event collected by the event collection unit 511 in accordance with the information of the storage destination of the event stored in the notification setting holding unit 521. In a specific example, the event storage unit 512 determines the storage destination of the event in either the message buffer 520a, or the message buffer 520b, or both the message buffer 520a and the message buffer 520b, in accordance with the information of the storage destination of the event. By the distribution of the storage destination of the event, for example, the message buffer 520a does not request the client application 540a, and the event that the other client application 540b has requested is not written. That is, only the event to be transmitted to the management server 110a is stored in the message buffer 520a, and only the event to be transmitted to the management server 110b is stored in the message buffer 520b. Therefore, data that is outside of a contract is no longer sent to each of a management server 110.

Next, details of the notification setting of an event will be explained. Table 1 is a table showing the relationship between the notification setting of an event and the event.

TABLE 1

| Collection | Periodic Transmission | Event | Explanation |
|---|---|---|---|
| Basic | ○ | BasicInfoSnapShotted | Basic configuration, such as firmware version |
| Counter | ○ | CounterSnapshotted | List of billing counter |
| FunctionCounter | ○ | FunctionCounterSnapshotted | Function counter list |
| PartsCounter | ○ | PartsCounterSnapshotted | Part counter list |
| Configuration | ○ | ApplicationSnapShotted | Installed application list |
|  |  | AccesorySnapShotted | Connected accessory list |
| Power |  | DevicePowerOn | Turn on power of device |
|  |  | DeviceSleepStarted | Transition to sleeping of device |
|  |  | DeviceSleepReverted | Return from sleeping of device |
|  |  | DevicePowerOff | Turn off power of device |
| Alarm |  | ErrorOccurred | Occurrence of Error |
|  |  | AlarmOccured | Occurrence of alarm |
| Information |  | TonerBottleInstalled | Installation of toner bottle |
|  |  | TonerBottleRemoved | Removal of toner bottle |
|  |  | TonerBottleEmptied | Toner bottle being empty |
| Job |  | JobStarted | Input job |
|  |  | JobCompleted | Completion of execution of job |
|  |  | JobExecuting | Start execution of job |
| Diagnosis |  | DiagnosisCompleted | Completion of self-diagnosis |
|  |  | LifePredictionInitialized | Initialization of part life information |
|  |  | LifePredictionThresholdReached | Reaching of part life |
|  |  | LifePredictionDiscontinued | Stop calculation of part life |

A name described in the "Event" column is a unit (hereafter, referred to as an "event") normalized by assigning a name to transition of a state in which the name has occurred in the device. That is, the event is a unit that is collected from the device by the event management unit 510 and stored in the message buffer 520, and is a unit to be sent to the management server 110. For example, "Job Started" is an event meaning that a job, such as copying, printing, or the like, has started to be executed. "ErrorOccurred" is an event that means that some kind of abnormal state has occurred in the device. The "Explanation" column is an explanation of each event.

The names listed in the "Collection" column are units obtained by grouping a plurality of events in a set of meaning of operation (hereinafter, referred to as "collection"). In the present embodiment, the validity of transmission to the management server 110 is set in units of collection. Therefore, in the notification setting of the event held by the notification setting holding unit 521, the type of data to be collected in the client 120 is set by the unit of collection. For example, when the collection "Alarm" is designated in the event notification setting, the events "ErrorOccurred" and "AlarmOccurred" are sent to the management server 110. That is, when the collection "Alarm" is designated, the events "ErrorOccurred" and "AlarmOccurred" become the collection target of the event collection unit 511.

The "Periodic Transmission" column defines, in a collection unit, whether or not an event is an event of a snapshot to which an event is periodically sent. An event marked with an "○" in the "Periodic Transmission" column is an event of a snapshot periodically sent by a start, timer, or the like. When the periodic transmission is enabled, the notification setting management unit 523 sets the transmission interval of the event of the collection in which the periodic transmission is enabled, and stores the event in the notification setting holding unit 521 as part of the event notification setting. For example, when the periodic transmission of the "Basic" collection is designated, a "BasicInfoSnapshotted" event having basic information such as a model name, an installation location, and a firmware version in an attribute is periodically sent to the management server 110 at the designated transmission interval. Similarly, when the periodic transmission of the collection of the counter is designated, "CounterSnapshotted", "PartsCounterSnapshotted", and the like are periodically transmitted. Note that "CounterSnapshotted" is a list of counter information for billing, and "PartsCounterSnapshotted" is information indicating a list of counter information on the degree of wear of a part.

Figure 6A:
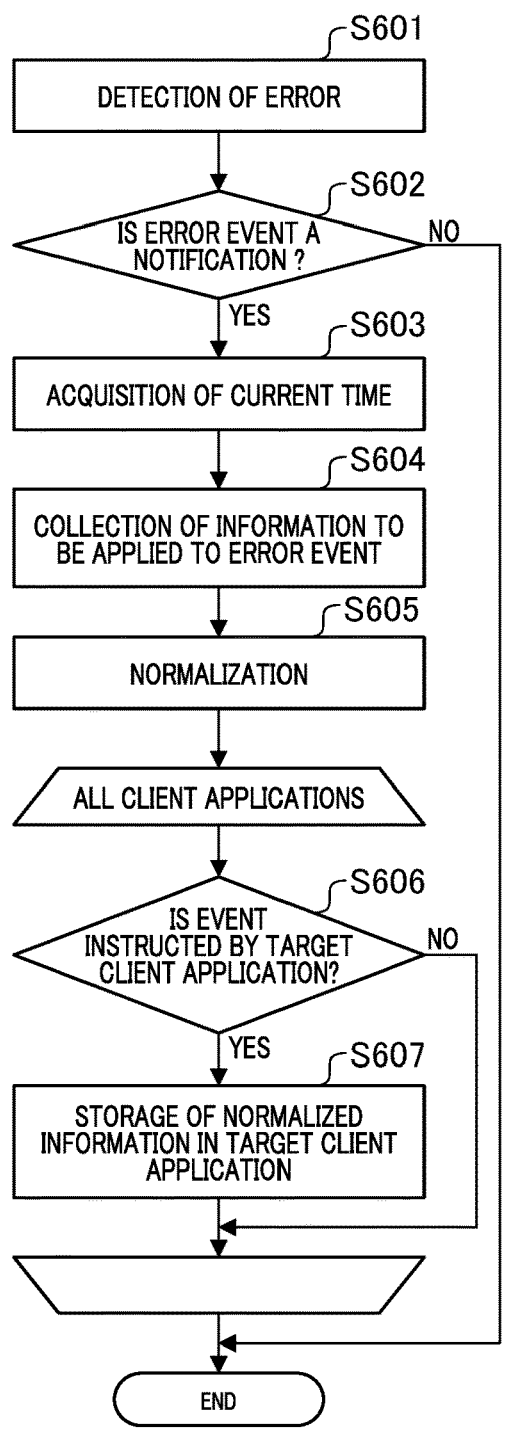
FIG. 6A and FIG. 6B are flowcharts that illustrate event collection, storage, and processing in a first embodiment.
Figure 6B:
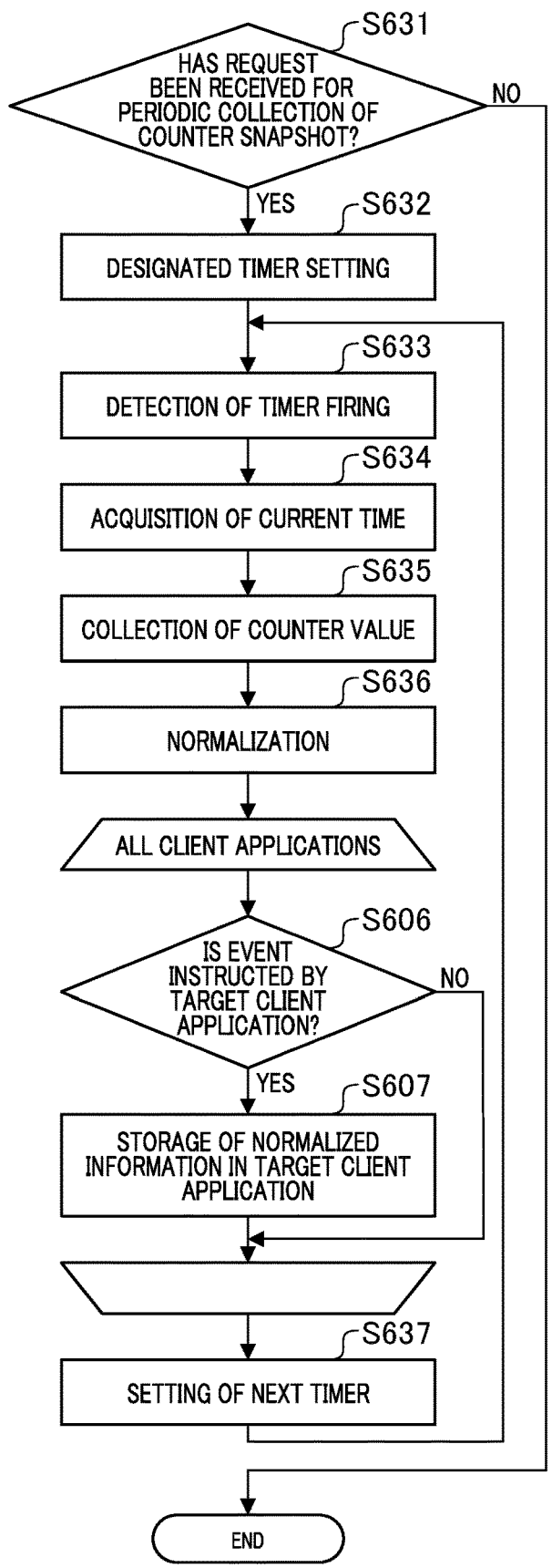

FIGS. 6A and 6B are flowcharts illustrating an event collection process and a storage process according to the first embodiment. In order to transmit various matters in the client 120 to the management server 110 as an event, the event collection unit 511 collects the target data, and the event storage unit 512 indicates the flow until the event is stored in each message buffer 520. Each of the processes shown in FIGS. 6A and 6B is implemented by the CPU 401 deploying a program stored in a readable storage medium (ROM 402 or HDD 404) to the RAM 403 and executing the program.

Firstly, a process of monitoring a state transition generated in a module for spontaneously issuing an event, collecting data of state transition in real time, and storing the data as an event will be explained. As a specific example, a case in which an error occurs in the client 120 will be explained. FIG. 6A is a flowchart illustrating a process of collecting and storing an error occurrence event.

In step S601, the event collection unit 511 detects the occurrence of an error in the client 120. In a specific example, when an error occurs in the client 120, the error control unit 505 firstly detects the error. The error control unit 505 that has detected the error notifies the event collection unit 511 of the occurrence of an error. The event collection unit 511 receives the notification from the error control unit 505 and detects the occurrence of the error in the client 120.

In step S602, the event collection unit 511 determines whether or not an event of the occurrence of an error detected in step S601 (hereinafter, referred to as an "error event") is a target to be notified to the management server 110. The event collection unit 511 determines whether or not the error event is a notification target according to the notification setting of the event stored in the notification setting holding unit 521. If the collection including the error event is set as the notification target to the management server 110 in the event notification setting, the processing proceeds to step S603. In contrast, if the collection including the error event has not been set as the notification target to the management server 110 in the event notification setting, the processing ends. According to step S601 and step S602, the event collection unit 511 can collect only the event set to the notification target in the event notification setting.

In step S603, the event collection unit 511 acquires the current time. Then, in step S604, the event collection unit 511 collects information to be applied to the error event. In step S605, the event storage unit 512 normalizes the error event with the application information and time information. The event storage unit 512 is normalized in a format such as JSON or the like.

Step S606 and step S607 are storage processing of events that are executed for each of client application 540 executing the current event data collection instruction. In the present embodiment, storage processing of an event corresponding to each of the client application 540a and the client application 540b is executed.

For example, first, the client application 540a executes the storage process of an event on an object. In step S605, the event storage unit 512 determines whether or not the error event collected by the event collection unit 511 is an event indicated to be collected and stored by the client application 540a. In a specific example, the event storage unit 512 determines whether or not the message buffer 520a corresponding to the client application 540a is designated as the destination for storing an error event in accordance with the information of the destination for storing the event stored in the notification setting holding unit 521. When the message buffer 520a is designated as the storage destination of the error event, the processing proceeds to step S607. In contrast, when the message buffer 520a is not designated as the storage destination of the error event, the storage processing of the event corresponding to the client application 540a ends.

In step S607, the event storage unit 512 stores the error event in the message buffer 520a of the client application 540a. When the storage processing of the event targeting the client application 540a has completed, the processing of storing the event targeting the client application 540b is executed next. In this way, the event storage processing of step S606 and step S607 is repeated until every client application 540 executing the event data collection instruction has been executed.

Thereafter, the event stored in the message buffer 520a is read by the client application 540a and transmitted to the management server 110a. Similarly, the event stored in the message buffer 520b is read by the client application 540b and transmitted to the management server 110b.

Next, a process of collecting data of periodic transmission and storing the collected data as an event will be explained. As a specific example, a case in which the data of a snapshot of a counter in the client 120 is periodically transmitted is explained. FIG. 6B is a flowchart illustrating a process of periodically collecting and storing a snapshot of a counter.

In step S631, the event collection unit 511 determines whether or not there is a periodic collection request of the counter snapshot from the client application 540. As a specific example, the event collection unit 511 determines whether or not there is a collection in which a periodic collection request for a counter snapshot according to whether or not a periodic transmission has been set in the notification setting of the event held by the notification setting holding unit 521. When there is a collection in which the periodic transmission is set in the notification setting of an event of the notification setting holding unit 521, it is determined that there is a request for a periodic collection of the counter snapshot and the processing proceeds to step S632. In contrast, if there is no periodic collection request for the counter snapshot, the processing ends.

In step S632, the event collection unit 511 sets the timer of a period designated by the event notification setting of the event held by the notification setting holding unit 521. Thereafter, in step S633, the event collection unit 511 detects the firing of the timer set in step S632. The event collection unit 511 that has detected the firing of the timer acquires the current time in step S634. In step S634, the event collection unit 511 that detects the firing of the timer acquires the current time. Then, in step S635, the event collection unit 511 collects the counter value of the target of the timer that has fired from the counter management unit 507. In step S636, the event storage unit 512 normalizes the collected counter data with time information. In step S636, the event storage unit 512 normalizes the collected data of the counter together with the time information. The event storage unit 512 is normalized in a format such as JSON or the like.

Next, the storage processing of the normalized event is performed for each client application 540. The storage processing of the event in FIG. 6B is the same as the storage processing of the event explained in FIG. 6A, and therefore the explanation thereof is omitted by assigning the same reference numerals. When the storage processing of the event is completed, the event collection unit 511 sets the next timer in step S637. When the setting of the timer is completed, the processing returns to step S633. By the processing explained above, by periodically repeating the collection and storage processing of the counter, each client application 540 can periodically transmit the counter event to the corresponding management server 110.

The data of the client 120 collected and stored in the processing of FIGS. 6A and 6B is transmitted to the management server 110 and used for various services and applications constructed on a system including the management server 110. Therefore, because necessary data, that is, data to be collected, are different in accordance with the contracted service, the notification setting of the event is different for each service. In the present embodiment, the notification setting of the event is managed in the form of a collection file. Thus, the contents described in a collection file are different for each contracted service.

For example, in the case of a system that provides a service for monitoring a micro operating status such as an operating status in a dashboard or the like, the collection of "Counter" and "Alarm" represented in Table 1 are described in a collection file. In a system for providing an automatic delivery service for consumables, the collection of "Information" represented in Table 1 is described in a collection file. In a system for monitoring the operation state of the client 120 to provide maintenance services, the collection of "Diagnosis" represented in Table 1 is described in a collection file.

Figure 7:
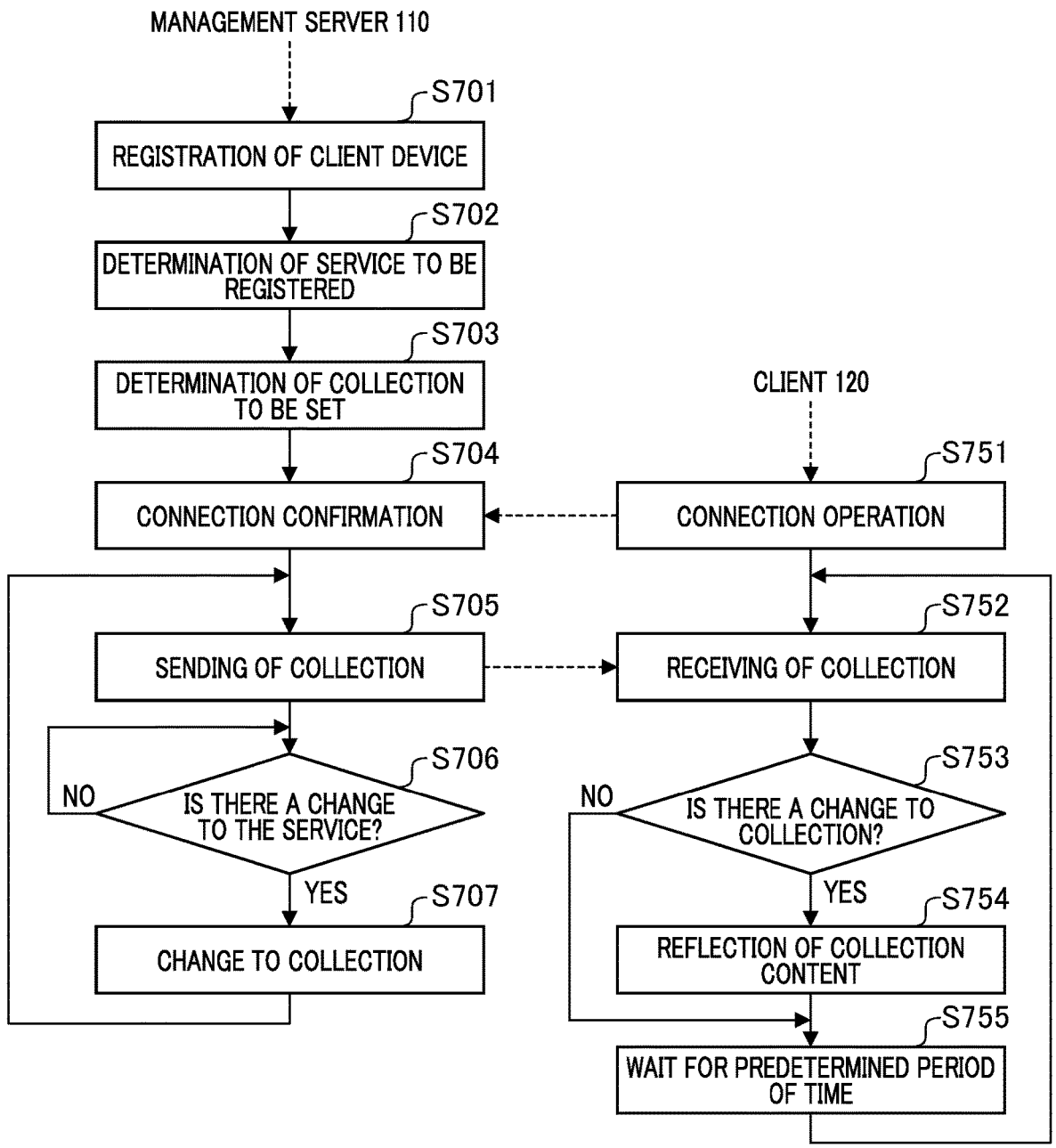
FIG. 7 is a flowchart illustrating the processing for acquiring/updating the notification setting of an event.

A process of connecting the management server 110 and the client 120, and setting and managing a collection file that is a notification setting of an event will be explained. FIG. 7 is a flow chart illustrating the process of acquiring and updating the event notification setting. In FIG. 7, each process executed by the system including the management server 110 providing the service to the client 120 is explained as a process executed by the management server 110. Each process on the management server 110 side as illustrated in FIG. 7 is implemented by the CPU 201 deploying a program stored in a readable storage medium (ROM 202 or HDD 204) in the RAM 203 and executing the program. In addition, each process on the client 120 side is implemented by the CPU 401 deploying a program stored in a readable storage medium (ROM 402 or HDD 404) in the RAM 403 and executing the program.

First, the pre-processing performed before the management server 110 side is connected to the client 120 will be explained. In step S701, the management server 110 registers the information of the client device connected to the management server 110. The information of the client device includes a device serial number, customer information, and the like. In the present embodiment, an example in which the management server 110 is connected to the client 120 is explained. Thereafter, in step S702, the management server 110 determines a service to be provided to the client 120 based on the contract content of the customer having the client 120. In step S703, the management server 110 determines the contents of the collection file to be arranged at the client 120 according to the service provided to the client 120.

In contrast, on the client 120 side, in step S751, the network communication unit 531 performs a connection operation to the management server 110. Specifically, a connection is made with the management server 110 via the network 100 by a procedure such as entering the address of the management server 110 in the network settings and the like. Thereafter, communication with the management server 110 is performed.

Upon receiving the connection process (step S751) from the client 120, in step S704, the management server 110 confirms the connection of the client 120. Thus, communication between the client 120 and the management server 110 is established and data can be exchanged.

In step S705, the management server 110 transmits the collection file determined in step S703 to the client 120. In step S752, the notification setting acquisition unit 532 of the client 120 receives the collection file transmitted from the management server 110. Then, the notification setting acquisition unit 532 transfers the received collection file to the notification setting management unit 523.

In step S753, the notification setting management unit 523 compares the collection file acquired in step S752 with the collection file having the same acquisition source stored in the notification setting holding unit 521, and determines whether or not there is a change. If there is a change, the processing proceeds to step S754. In contrast, if there is no change, the processing proceeds to S755. Note that if the collection file having the same acquisition source does not exist in the notification setting holding unit 521, that is, when this is a collection file that has been received from the management server 110 for the first time, the processing proceeds to step S754 with the assumption there was a change.

In step S754, the notification setting management unit 523 rewrites the collection file stored in the notification setting holding unit 521 into the collection file received in step S752. By collecting and storing the event according to the updated latest collection file, it is possible to execute the sending of the event indicated from the management server 110. Thereafter, after waiting a predetermined period of time in step S755, the process returns to step S752 again, and the latest collection file is acquired from the management server 110, and if there is a change in the content of the collection file, the operation of reflecting the collection file in the notification setting holding unit 521 is repeated.

After step S705 on the management server 110 side, when the service to be provided to the client 120 has changed, the collection file is changed, and the changed collection file can be sent to the client 120. In a specific example, first, in step S706, the management server 110 determines whether or not the content of the service provided to the client 120 has been changed due to a change in the contract content of the customer or the like. If the content of the service has been changed, the processing proceeds to step S707. In contrast, if there is no change in the content of the service, step S706 is repeated. In step S707, the management server 110 changes the collection file in accordance with a change in the service. When the change in the collection file is completed, the process returns to step S705 and the changed collection file is transmitted to the client 120.

As explained above, by changing the collection file, it is possible to change the notification setting of the client 120 in accordance with the service content contracted by the customer.

FIG. 8 is a diagram that illustrates an example of a collection file. A collection file 800 is the definition information describing the notification setting of an event, and the type of data to be collected within the client 120 and the collection conditions are defined. The collection file 800 is generated by the management server 110 and transmitted from the management server 110 to the client 120 in step S705 of FIG. 7. The transmitted collection file 800 is received by the client 120 in step S752. Each collection file 800 received from each of a management server 110 is managed by the notification setting management unit 523 in the client 120. In the present embodiment, an example of a collection file 800 in a JSON format is explained. However, the format of the collection file 800 may be a format that can be normalized by text, such as XML, CSV, or the like. When collecting the data in the client 120, the description content of the collection file 800 is referred to in step S601 or step S631.

Three types of notification settings (a notification setting 801 to a notification setting 803) are described in the collection file 800. Each notification setting describes the type of data to be collected for sending to the management server 110 and the collection conditions. In a specific example, a collection to which an event belongs is described as a type of data, and a timing for collecting data is described as a data collection condition.

In the notification setting 801, "Power" and "Alarm" are described as the types of data to be collected, and "realtime" is described as a condition to be collected. The "realtime" is a definition of immediately sending an event when the event occurs. That is, in the notification setting 801, when an event belonging to the "Power" and "Alarm" collection occurs, the notification setting 801 is set so as to immediately transmit the event. When "realtime" is set, as illustrated in FIG. 6A, data is collected in accordance with the occurrence of an error and the like in the client 120, and an event is issued and sent to the management server 110.

In a notification setting 802, "Basic" is described as the type of data to be collected, and "up/cron" is described as the condition to be collected. "Up" is a definition of startup and "cron" is the definition of periodically transmitting. In the "cron" example of the notification setting 802, the period of a periodic transmission is defined for six hours. That is, this is set so that in the notification setting 802, the event belonging to the "Basic" collection is set to be sent to the management server 110 at the time of startup of the client 120 and transmitted periodically in a six-hour period after startup.

In the notification setting 803, "Counter" and "PartsCounter" are described as the types of data to be collected, and "cron" is described as the condition to be collected. In the "cron" example of the notification setting 803, the period of periodic transmission is defined as 12 hours. That is, in the notification setting 803, the event belonging to the collection of "Counter" and "PartsCounter" is set to be sent to the management server 110 at a 12-hour period after the startup of the client 120. The notification setting 802 and the notification setting 803 are examples of a periodic transmission. As illustrated in FIG. 6B, the event is issued by collecting data according to the timer in accordance with the notification setting, and the event is sent to the management server 110.

Next, the management of the event notification setting by the notification setting management unit 523 will be explained. The notification setting management unit 523 acquires from the notification setting acquisition unit 532 of each of a client application 540 the collection file sent from the management server 110 as the notification setting of the event. When there is a plurality of a client applications 540, the notification setting management unit 523 integrates and manages the notification settings (collection files) of the plurality of events acquired from each client application 540. The notification setting of an event managed by the notification setting management unit 523 is stored in the notification setting holding unit 521.

Next, the integration of an event notification setting will be explained. Table 2 is an example of notification setting of an event for each client application and indicates notification settings indicated by three client applications.

TABLE 2

| Client A | | | Client B | | | Client C | | |
| --- | --- | --- | --- | --- | --- | --- | --- | --- |
| Collection | Firing type | Period (h) | Collection | Firing type | Period (h) | Collection | Firing type | Period (h) |
| Power | realtime | — | Job | realtime | — | Basic | cron | 2 |
| Alarm | realtime | — | Alarm | realtime | — | PartsCounter | cron | 2 |
| Basic | up/cron | 6 | Basic | up/cron | 4 | FunctionCounter | cron | 2 |
| Counter | cron | 12 | Counter | cron | 4 | | | |
| PartsCounter | cron | 12 | FunctionCounter | cron | 4 | | | |

Table 2 shows the collection, firing type, and period acquired from a collection file for each client application. "Collection" indicates the type of data to be collected, and "firing type" and "period" indicate the conditions in which data is collected.

Table 3 is an example of a notification setting table in the first embodiment in which the setting notification of the event shown in Table 2 is integrated.

TABLE 3

| Collection | Firing type | Period (h) | Write destination |
|---|---|---|---|
| Power | realtime | — | A |
| Alarm | realtime | — | A, B |
| Job | realtime | — | B |
| Basic | up/cron | 6 | A, B, C |
| Counter | cron | 12 | A, B |
| PartCounter | cron | 12 | A, C |
| FunctionCounter | cron | 2 | B, C |

In the notification settings of the integrated event, a message buffer to be a write destination of the collected data is set in addition to a collection, a firing type, and a period. The destination for writing the collected data is a message buffer reserved for the client application that indicates the notification setting of the collection. "A" represented in Table 3 is a message buffer A corresponding to the client application A. Similarly, "B" indicates a message buffer B corresponding to client application B, and "C" indicates a message buffer C corresponding to client application C.

The collection of events occurring in "realtime" is simply integrated by taking "OR" thereof. In a specific example, by taking "OR", all collections in which the firing type is set to "realtime" in the notification setting of each client is described in the file of the setting notification after integration, and the indicated client application is registered as the write destination. In Table 2, the collections for which the firing type is "realtime" are "Power" and "Alarm" for Client A, and "Job" and "Alarm" for Client B. When these are integrated, the firing type is "realtime", the write destination is "Power", which is the message buffer "A", the write destination is "Alarm", which is the message buffer "A" and the message buffer "B", and the write destination is "Job", which is the message buffer "B". As with "Alarm", data of the same type in which conditions indicated by a plurality of client applications match are collected at a time by an event collection unit 511 and stored in each message buffer by the event storage unit 512.

In contrast, an event of periodic transmission may indicate different periods from a plurality of client applications. However, when registered in a table in which the notification settings of events of each client application have been integrated, one period is selected for each collection. Therefore, in the present embodiment, requests of periodic transmission events having different periods are integrated into one period in a rounding manner.

Specifically, the period is determined based on the following two rules:

Rule 1: When a client application has priority, the client application is set at a set period of the high-priority client application.

Rule 2: When the priority of client applications is the same, the shortest period is set.

When the priority of the three client applications is A>B=C, following the above-described integration rules, after the integration of Table 2, the result is as shown in Table 3.

For example, in Table 2, the collection of periodic transmissions overlapping in a plurality of client applications includes "Basic", "Counter", "PartCounter", and "FunctionCounter". Among these, since the priority of the client applications is set to A>B=C for the "Basic", "Counter", and "PartCounter" periods, the period designated by the client application A is adopted. For the period of "FunctionCounter" requested by the client application B and client application C having the same priority, the shortest period, 2 hours, is adopted. Note that, although an example in which a period is set according to Rule 1 and Rule 2 has been explained in the present embodiment, the period may be set only by Rule 2, which sets the shortest period.

The table (Table 3) of the notification setting of the event in which the notification setting (collection file) of the event of each client application is integrated by the notification setting management unit 523 is stored in the notification setting holding unit 521. In addition, the table of the notification setting of the event is then referred to at the time of event collection (step S602, step S631, and step S632 in FIGS. 6A and 6B) and at the time the event is stored (step S606 in FIG. 6A). For example, by referring to the table of the event notification setting, the event storage unit 512 stores the events collected at a time in the message buffer designated as the write destination in the table of the event notification setting. By storing an event only in the specified message buffer, it is possible to transmit only the event specified by the individual contract to each management server 110.

As explained above, according to the present embodiment, by integrating the notification settings of the events of the plurality of client applications, the operation of the event management unit 510 can be minimized and the collection operation can be unified. In addition, at the same time, the event data other than those requested to be collected from each client application are controlled so as not to be written in the message buffer of the corresponding client application. Therefore, each management server can transmit only the data individually designated by the management server and can control the data not included in the contract so as to not be transmitted. Accordingly, according to the present embodiment, it is possible to control the data collection mechanism in the client 120 so as not to send the data to be collected to each cloud service while operating only one data collection mechanism in the client 120.

Second Embodiment

In the first embodiment, an example in which the efficiency of the operation of the event management unit 510 is realized by rounding different periods into one period when receiving an instruction of a different period has been explained. However, in the first embodiment, there is also a case where the management server 110 cannot acquire an event at the intended period. For example, in the examples of Table 2 and Table 3, the client application B is in a state where, as a result of periodic integration, it can receive an event issued for any periodic transmission event, but it receives the event collected at a period different from the intended period. Hence, in a second embodiment, the period in which an event is collected is set to the greatest common divisor of the periods indicated by the plurality of collections. Further, when storing a message in the message buffer 520, the client application B carries out control so as to determine whether or not the timing to be stored in each of a message buffer 520 is present, so that event can be transmitted at an intended timing to any management server 110.

Table 4 is an example of a notification setting table in the second embodiment in which a setting notification for the event shown in Table 2 is integrated.

TABLE 4

| Collection | Firing type | Period (h) | Write destination |
|---|---|---|---|
| Power | realtime | — | A |
| Alarm | realtime | — | A, B |
| Job | realtime | — | B |
| Basic | up/cron | 2 | A(3), B(2), C(1) |
| Counter | cron | 4 | A(3), B(1) |
| PartCounter | cron | 2 | A(6), C(1) |
| FunctionCounter | cron | 2 | B(2), C(1) |

The period of the notification setting table is a period in which the event collection unit 511 collects an event. The notification setting management unit 523 sets, as a period for collecting an event, a period that is the greatest common divisor of the instructed periods when a different period has been indicated from a plurality of a management server 110 in a certain collection.

The write destination of the notification setting table indicates a message buffer for storing an event collected by the event sending unit 530. In a case where different periods are indicated from a plurality of a client application 540 in a certain collection, the information of the timing to be stored in each message buffer 520 is held in addition to the message buffer 520 to be the storage destination in the write destination. In a specific example, the storage interval (a designated period divided by the greatest common divisor) for each client application 540, which indicates how many times the event collection period, which is the greatest common divisor, may be written for each information of the write destination, is held for each storage destination message buffer 520. In the parentheses of the write destination of the notification setting table is a value of a storage interval.

FIG. 9 is a flowchart illustrating an event collection and storage process in the second embodiment. In order to transmit various matters in the client 120 to the management server 110 as an event, the event collection unit 511 collects the target data, and the event storage unit 512 indicates a flow until the event is stored in each of a message buffer 520. As a specific example, a case in which data of a snapshot of a counter in the client 120 is periodically transmitted will be explained. Each of the processes illustrated in FIG. 9 is realized by the CPU 401 deploying a program stored in a readable storage medium (ROM 402 or HDD 404) and executing the deployed program in the RAM 403.

In step S901, the event collection unit 511 determines whether or not there is a periodic collection request of a counter snapshot from the client application 540. The processing of step S901 is the same as that in step S631. If there is a collection in which periodic transmission is set in the notification setting of the event in the notification setting holding unit 521, it is determined that there is a periodic collection request for the counter snapshot and the processing proceeds to step S902. In contrast, when there is no periodic collection request for the counter snapshot, the processing ends.

In step S902, the event collection unit 511 acquires a period and a storage interval for collecting the periodic transmission event from the notification setting of the event stored in the notification setting holding unit 521, and sets an initialized firing count N (N=0). In a specific example, the event collection unit 511 acquires the period of the collection to be periodically transmitted and the storage interval set for each message buffer 520 with reference to the notification setting table (Table 4) stored in the notification setting holding unit 521. The period acquired at this time is the greatest common divisor of the period of periodic transmission of each collection designated by each client application 540. In the example of Table 4, the period of the counter snapshot is 4 hours, the storage interval to the message buffer A is 3, and the storage interval to the message buffer B is 1.

In step S903, the event collection unit 511 sets a timer based on the period acquired in step S902. In the example of Table 4, the event collection unit 511 sets a 4-hour timer. Thereafter, in step S904, the event collection unit 511, which has detected the firing of the timer, increments the event collection unit 511 the firing count by N=N+1 in step S905. For the first time, N=1 is satisfied.

In step S906, the event collection unit 511 determines whether or not to collect the event according to the firing of the current timer on the basis of the firing number N incremented in step S904 and the storage interval acquired in step S902. In a specific example, whether or not an event is to be collected is determined according to whether or not the firing number N is a multiple of any one of the storage intervals. If the firing number N is a multiple of any one of the storage intervals, the processing proceeds to step S907. In contrast, if the firing number N is not a multiple of any one of the storage intervals, the processing proceeds to step S911. By this processing, because the event collection can be executed only when the event collection is necessary among the periods of firing of the timer set at the greatest common divisor, the operation of the event management unit 510 can be suppressed. In the example of Table 4, because the storage interval of message buffer A is 3 and the storage interval of message buffer B is 1, it is determined that the recovery of the event is to be executed even in the first case where the firing number is N=1.

In step S907, the event collection unit 511 acquires the current time. Then, in step S908, the counter value of the target of the timer that has fired is collected from the counter management unit. In step S909, the event storage unit 512 normalizes the data of the collected counter along with time information. The event storage unit 512 is normalized in a format such as JSON or the like.

In step S910, the event storage unit 512 stores the normalized event in the target message buffer. The message buffer to be the storage destination of the event is determined based on the notification setting table (Table 4) stored in the notification setting holding unit 521 and the firing number N. For example, when the firing number N is 1 or 2, the event storage unit 512 stores the event only in the message buffer B. When the firing number N is 3, the event storage unit 512 stores the event in the message buffer A and the message buffer B.

When the event storage process ends, in step S911, the event collection unit 511 sets the next timer. When the timer set is completed, the processing returns to step S904. Note that in the flowchart of FIG. 9, in step S906, the event collection unit 511 determines whether or not to collect data based on the storage interval, but the data may be collected for each period of the greatest common divisor without performing this determination. Whether or not the collected data is a period for storing the collected data in each message buffer is determined by the event storage unit 512 in step S910.

According to the above processing, in the case of firing count N=1, that is, 4 hours, or when the firing count N=2, that is, 8 hours, the event is stored only in the message buffer B, and the event is transmitted by the client application B to the corresponding management server. When the firing number N=3, that is, 12 hours, the event is stored in the message buffer A and the message buffer B, and the event is transmitted by each client application to each management server.

In this way, according to the second embodiment, with respect to an event of periodic transmission, an event can be written in each message buffer at a period requested by each client application while operating by one period timer. Thus, it is possible to send a desired event at the timing intended by each of a management server 110 while achieving efficiency by integrating the periodic timer in the client 120.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-008767, filed Jan. 22, 2021, which is hereby incorporated by reference herein in its entirety.

What is claimed is:

1. A network device in which a first client application for transmitting data via a network to a first system is executed, the network device comprising:
at least one memory storing instructions; and
one or more processors configured to execute the instructions, which when executed by the one or more processors, cause the network device to:
manage a first definition information in which a type of data to be collected in the network device and a first collection condition are defined received from the first client application;
manage, after a second client application for transmitting data to a second system via the network is added to the network device, second definition information in which a type of data to be collected in the network device and a second collection condition are defined received from the added second client application;
collect data in the network device in accordance with the first definition information and second definition information, wherein data to be collected in accordance with both the first collection condition and the second collection condition is collected at a same timing; and
store the data collected in accordance with both the first collection condition and the second collection condition in a first dedicated area that is reserved for the first client application and a second dedicated area that is reserved for the second client application,
wherein the first client application transmits the data acquired from the first dedicated area to the first system, and
wherein the second client application transmits the data acquired from the second dedicated area to the second system.

2. The network device according to claim 1, wherein, with respect to data having a different condition collected in the first definition information and the second definition information, the instruction causes the network device to collect a target data in accordance with a condition received from a client application having a high priority.

3. The network device according to claim 1, wherein, with respect to data having a different condition collected in the first definition information and the second definition information, the instruction causes the network device to collect a target data in accordance with a condition in which the period of collecting the data is the shortest.

4. The network device according to claim 1, wherein, with respect to data having a different condition collected in the first definition information and the second definition information,
the instruction causes the network device to collect a target data at a period of the greatest common divisor of periods of collecting the data defined in the first definition information and the second definition information, and
the instruction causes the network device to store the target data collected at one time at the period of a greatest common divisor in the first dedicated area in accordance with the period for collecting the data defined in the first definition information and in the second dedicated area in accordance with a period of collecting the data defined in the second definition information.

5. A control method for a network device in which a first client application is executed for transmitting data via a network to a first system, the method comprising:
managing a first definition information in which a type of data to be collected in the network device and a first collection condition received from the first client application are defined;
managing, after a second client application for transmitting data to a second system via the network is added to the network device, second definition information in which a type of data to be collected in the network device and a second collection condition received from the added second client application;
collecting data in the network device in accordance with the first definition information and second definition information, wherein data to be collected in accordance with both the first collection condition and the second collection condition is collected at a same timing; and storing the data collected in accordance with both the first collection condition and the second collection condition in a first dedicated area that is reserved for the first client application and a second dedicated area that is reserved for the second client application,
wherein, the first client application transmits the data acquired from the first dedicated area to the first system, and
wherein the second client application transmits the data acquired from the second dedicated area to the second system.

\* \* \* \* \*